United States Patent
Soshin

(10) Patent No.: US 9,201,908 B2
(45) Date of Patent: Dec. 1, 2015

(54) MULTI-LAYERED MULTI-TENANCY DATABASE ARCHITECTURE

(71) Applicant: Alexey Soshin, Ramat Gan (IL)

(72) Inventor: Alexey Soshin, Ramat Gan (IL)

(73) Assignee: SAP Portals Israel Ltd, Ra'anana (IL)

( * ) Notice: Subject to any disclaimer, the term of this patent is extended or adjusted under 35 U.S.C. 154(b) by 195 days.

(21) Appl. No.: 13/973,460

(22) Filed: Aug. 22, 2013

(65) Prior Publication Data

US 2015/0058376 A1    Feb. 26, 2015

(51) Int. Cl.
  *G06F 17/30* (2006.01)

(52) U.S. Cl.
  CPC .............................. *G06F 17/30292* (2013.01)

(58) Field of Classification Search
  USPC .................................................. 707/716, 781
  See application file for complete search history.

(56) References Cited

U.S. PATENT DOCUMENTS

| | | | | |
|---|---|---|---|---|
| 8,880,477 | B2 * | 11/2014 | Barker et al. | 707/649 |
| 9,020,901 | B2 * | 4/2015 | Chi et al. | 707/654 |
| 9,042,384 | B2 * | 5/2015 | Sridharan et al. | 370/392 |
| 2009/0049056 | A1 * | 2/2009 | Shutt et al. | 707/10 |
| 2010/0077449 | A1 * | 3/2010 | Kwok et al. | 726/3 |
| 2012/0158453 | A1 * | 6/2012 | Chung et al. | 705/7.26 |
| 2012/0173581 | A1 * | 7/2012 | Hartig et al. | 707/781 |
| 2013/0173669 | A1 * | 7/2013 | Tang et al. | 707/803 |

OTHER PUBLICATIONS

U.S. Appl. No. 13/331,703, filed Dec. 20, 2011, Alexey Soshin.
U.S. Appl. No. 13/535,565, filed Jun. 28, 2012, Alexey Soshin
U.S. Appl. No. 13/535,619, filed Jun. 28, 2012, Alexey Soshin.
U.S. Appl. No. 13/539,996, filed Jul. 16, 2012, Alexey Soshin.

* cited by examiner

*Primary Examiner* — Kim Nguyen
(74) *Attorney, Agent, or Firm* — Fish & Richardson P.C.

(57) ABSTRACT

Methods and systems for providing a multi-layered, multi-tenant database architecture. One example method includes identifying a plurality of tenants in a database system, each tenant associated with a data set and associated with a separation scheme defining how to separate the data set associated with the tenant from data sets associated with other tenants, identifying one or more separation scheme rules, each separation scheme rule including at least one tenant behavior condition and at least one migration action to be performed when a tenant from the plurality of tenants violates one of the tenant behavior conditions, determining that a particular tenant has violated one of the one or more separation scheme rules, and performing the at least one migration action associated with the violated rule in response to determining that the particular tenant has violated the rule.

17 Claims, 3 Drawing Sheets

MULTI-LAYERED MULTI-TENANCY DATABASE ARCHITECTURE

TECHNICAL FIELD

The present disclosure involves systems, software, and computer-implemented methods for providing a multi-layered, multi-tenant database architecture.

BACKGROUND

Many modern database systems include multi-tenancy features allowing the data from multiple tenants to be stored within a single database, a single schema, and/or a single table. Such multi-tenancy techniques allow the sharing of hardware and software between multiple tenants, thus allowing the tenants to avoid the time and expense of expense and time of purchasing and managing their own database software and hardware.

SUMMARY

In general, one aspect of the subject matter described in this specification may be embodied in systems and methods performed by data processing apparatuses that include the actions of identifying a plurality of tenants in a database system, each tenant associated with a data set and associated with a separation scheme defining how to separate the data set associated with the tenant from data sets associated with other tenants, identifying one or more separation scheme rules, each separation scheme rule including at least one tenant behavior condition and at least one migration action to be performed when a tenant from the plurality of tenants violates one of the tenant behavior conditions, determining that a particular tenant has violated one of the one or more separation scheme rules, and performing the at least one migration action associated with the violated rule in response to determining that the particular tenant has violated the rule.

Details of one or more implementations of the subject matter described in this specification are set forth in the accompanying drawings and the description below. Other features, aspects, and potential advantages of the subject matter will become apparent from the description, the drawings, and the claims.

DETAILED DESCRIPTION

Figure 1:
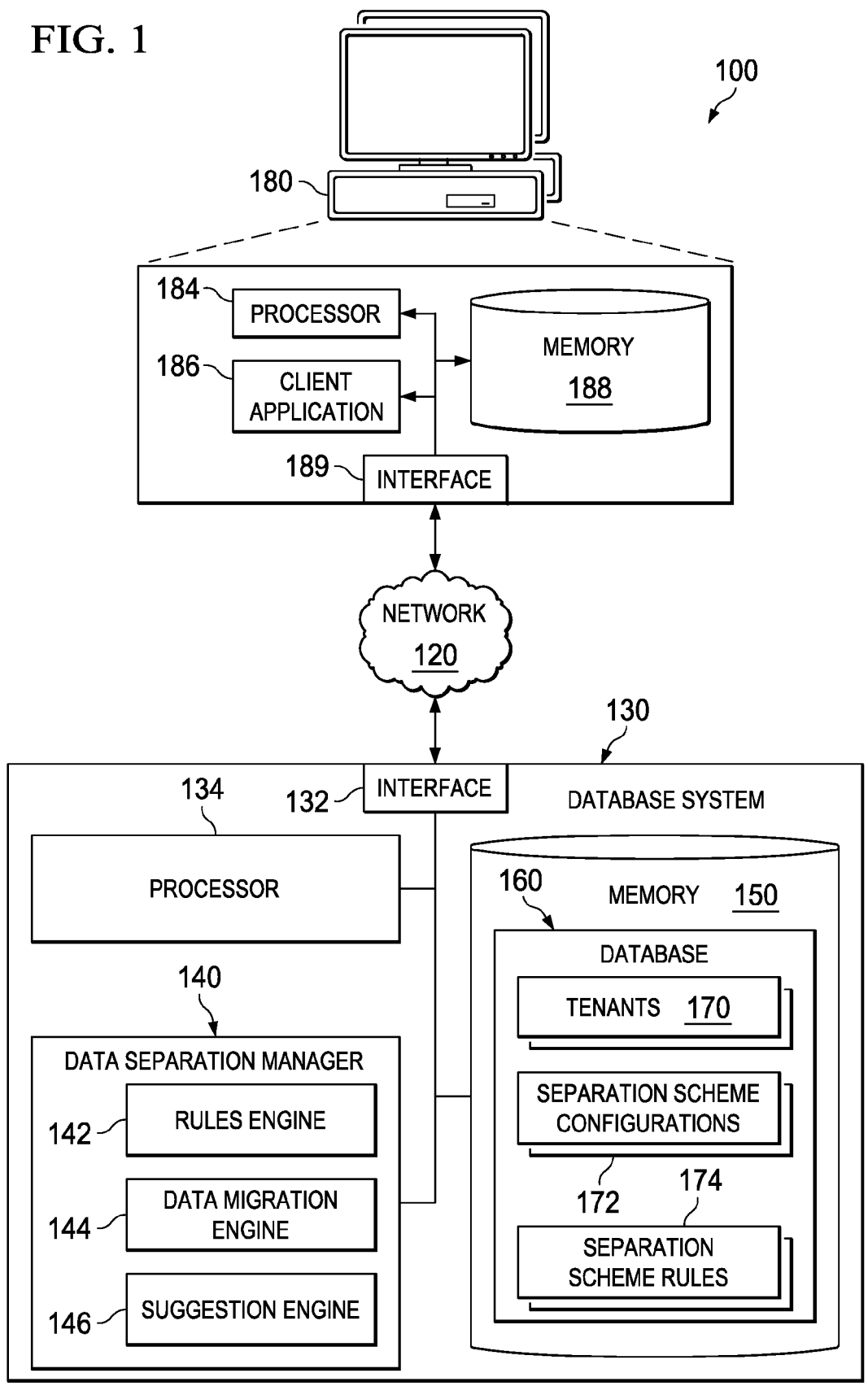
FIG. 1 is a block diagram illustrating an example environment for providing a multi-layered multi-tenancy database architecture.

The present disclosure involves systems, software, and computer-implemented methods for providing a multi-layered multi-tenancy database architecture.

Multi-tenant database architectures allow multiple entities to store data within the same database, schema, and/or table. In such configurations, tenants are associated with separation schemes, which are applied to a particular tenant's data to maintain separation from the data of other tenants stored in the same location. For example, a column-based separation scheme, such as that described relative to FIG. 2, stores rows from multiple tenants within a single table, differentiating the rows associated with each tenant by a respective tenant identifier column. In a schema-based separation scheme, such as that described relative to FIG. 3, each tenant has its data stored within a different schema within a database. In a database separation scheme, each tenant had its data stored within its own separate database. Although the examples provided in the present disclosure present disclosure are described relative to these three separation schemes, additional and alternative separation schemes are possible and are within the scope of the present disclosure.

The separation schemes are generally configured when the tenant is set up on the database system, where data is migrated between the separation schemes when deemed appropriate by administrator. One issue with multitenant database systems is that a single tenant may consume a large amount of hardware or software resources, and leave little resources for use by other tenants sharing the same hardware software. Such a situation may lead to decreased quality of service for the other tenants, including, but not limited to, slow response times to queries, service interruptions, and/or other decreases in service.

The present disclosure describes techniques related to migrating tenant data between different separation schemes in response to the detection of potential service issues. In one example implementation, an administrator may define separation scheme rules including tenant behavior conditions and corresponding migration actions that are to be performed should tenant behavior conditions are violated. The migration actions may include migration of the tenant data from one separation scheme to another. In one example, a particular tenant is detected using 95% of the processor resources on a database server when the particular tenant shares the database server with other tenants (e.g., using column-based separation or schema-based separation). If a separation scheme rule indicates that tenants using more than 90% of the processor resources on a database server should be migrated to database separation, the particular tenant may have its data automatically migrated to a separate database.

The techniques of the present disclosure provide several potential advantages. For example, automatically migrating tenant data between different separation schemes allows the database owner to more efficiently manage tenant data, as well as more efficiently use the hardware used to manage that tenant data. Further, automatic migration of data may simplify data management tasks related to a multi-tenancy database architecture. Additional advantages include a performance benefit for customers. For example, a large customer that resides in a schema with column-based separation may suffer from performance issues (e.g., as every query will need to query the data by specific ID) and affect other customers (e.g., if one customer's data uses 50% volume of the table, all other tenants may be required to ignore this data in every query they execute).

FIG. 1 is a block diagram illustrating an example environment 100 for providing a multi-layered multi-tenancy database architecture. The example environment 100 includes a network 120 that communicably connects one or more clients 182, a database system 130, and a database 190. The database system 130 includes a data separation manager 140 that manages data separation schemes associated with tenants stored in a database 160.

Figure 2:
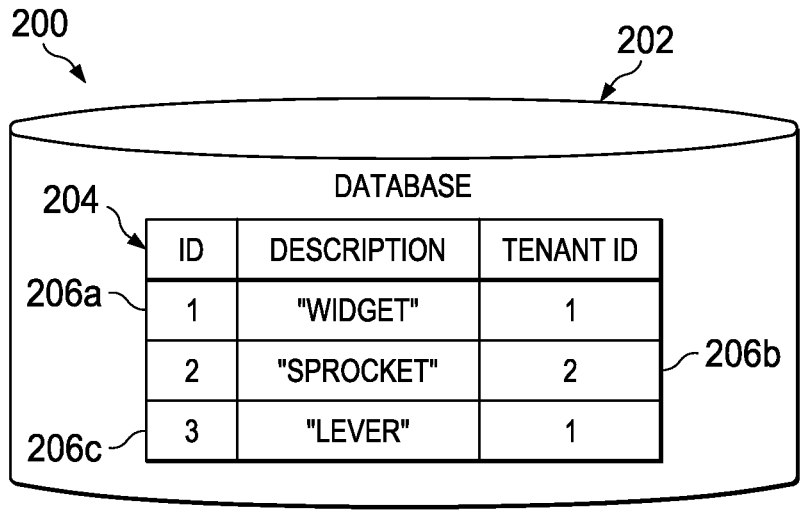
FIG. 2 is a block diagram illustrating an example data configuration using a column-based separation scheme.
Figure 3:
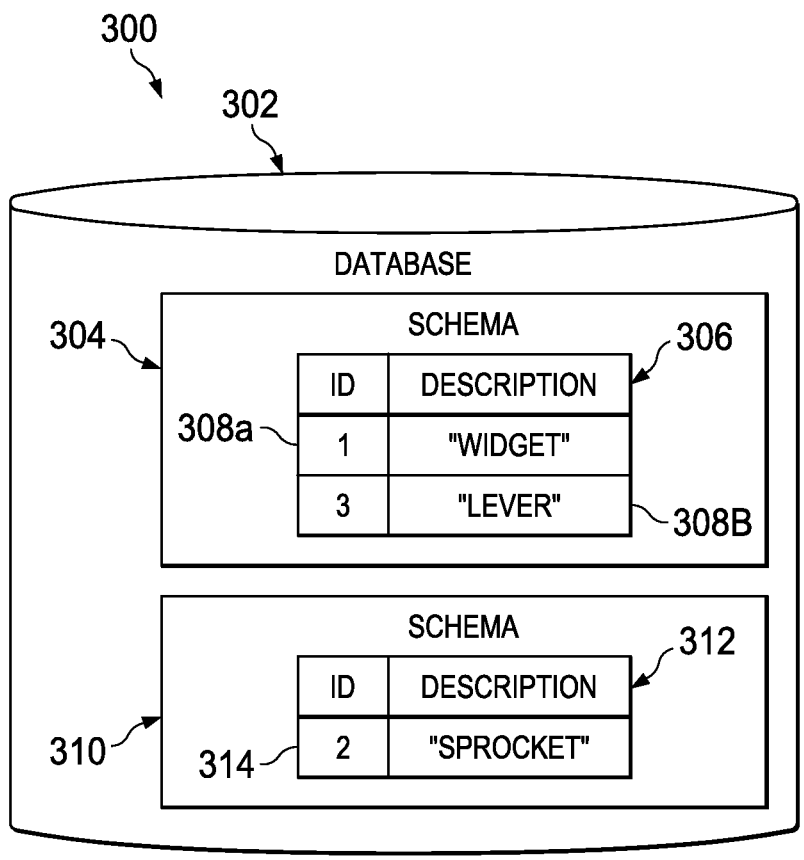
FIG. 3 is a block diagram illustrating an example data configuration using a schema-based separation scheme.
Figure 4:
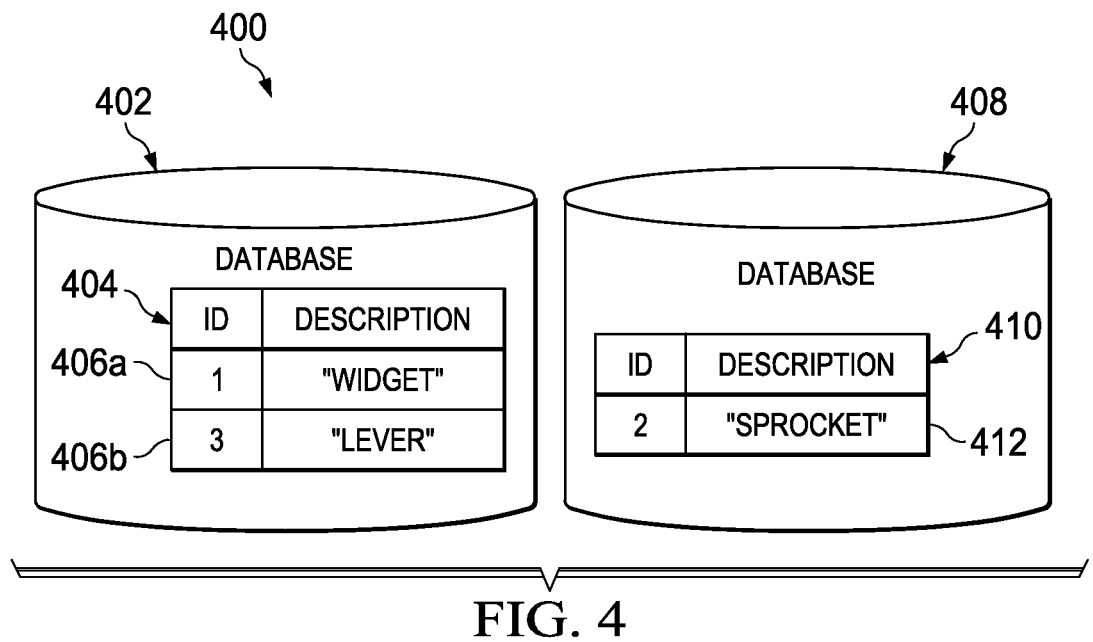
FIG. 4 is a block diagram illustrating an example data configuration using a database separation scheme.

In one example implementation, the database 160 includes data separation scheme configurations 172 associated with multiple tenants 170. The data separation scheme configurations 172 define how data associated with the various tenants (e.g., tenant data 176) is stored within the database 160 or within another external database. For example, the data separation scheme configurations 172 may indicate that one of the tenants 170 should have its data stored in a column-based separation scheme, as shown in the example of FIG. 2. The data separation scheme configurations 172 may indicate another of the tenants 170 should have its data stored in a schema-based separation scheme, as shown in the example of FIG. 3. The data separation scheme configurations 172 may indicate that another of the tenants 170 should have its data stored in a database separation scheme, as shown in the example of FIG. 4.

The tenants 170 are associated with one or more separation scheme rules 174. The separation scheme rules 174 define conditions that, when violated, will cause the tenant data 176 associated with a particular tenant 170 to be migrated to a different separation scheme. The conditions may include load conditions associated with accesses to a particular tenant's tenant data 176, space conditions associated with a number of rows stored, disk space used, or other space-related considerations, and/or other suitable conditions. Migrating the tenant data 176 to a different separation scheme may include selecting the particular tenant's tenant data 176 from the database 160, performing transformations to the data, and inserting the data back into the database 160 or an external database in accordance with the different separation scheme.

The enforcement of these separation schemes may be performed by the data separation manager 140. For example, the data separation manager 140 may detect that the tenant data 176 associated with a particular tenant is taking up 4 GB of space in the database 160. The data separation manager 140 may identify a separation scheme rule 174 indicating that tenants using more than 3 GB of space in the database 160 should be migrated to a database separation scheme. In response to a determination that the particular tenant is violating this rule, the data separation manager 140 may select the particular tenant's tenant data 176 and insert the tenant data 176 into an external database (e.g., 190) executing the appropriate separation scheme.

In another example, the data separation manager 140 may detect that the tenant data 176 for particular tenant is taking up less than 1 gigabyte of space in the database 160. The data separation manager 140 may identify a separation scheme rule 174 indicating that tenants using less than 1 gigabyte of space should use the column-based separation scheme. If the particular tenant associated with the tenant data 176 is currently using schema-based separation, the data separation manager 140 may select the particular tenant's data from the database 160, add a separator column to the data (e.g., tenant ID, as shown in FIG. 2), and insert the data into a column-based schema in the database 160.

As shown, the example environment 100 includes a database system 130. At a high level, the database system 130 comprises an electronic computing device operable to store data associated with multiple tenants and perform migration actions on the tenant data. The database system 130 may be a distributed system including different servers and components. In some implementations, the database system 130 may be a combination of hardware components and software components, and may be executed, at least in part, using a cloud-based system or solution. The database system 130 may also be the single computing device performing the actions described herein.

In some implementations, the database system 130 may be a web service that is accessible via standard web protocols, such as, for example, Hypertext Transfer Protocol (HTTP), Simple Object Access Protocol (SOAP), or any other suitable protocol or combination of protocols. In some cases, the database system 130 may provide an Application Programming Interface (API) through which the clients 180 may query data from the database 160, configure the operation of the data separation manager 140, and/or perform other actions. In some implementations, this protocol may be specific to the individual network service, or maybe generalized for use with many network services.

As used in the present disclosure, the term "computer" is intended to encompass any suitable processing device. For example, although FIG. 1 illustrates a database system 130, environment 100 can be implemented using two or more servers, as well as computers other than servers, including a server pool. Indeed, database system 130 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated database system 130 may be adapted to execute any operating system, including Linux, UNIX, Windows, Mac OS®, Java™, Android™, iOS or any other suitable operating system. According to one implementation, database system 130 may also include or be communicably coupled with an e-mail server, a Web server, a caching server, a streaming data server, and/or other suitable server.

The database system 130 also includes an interface 132, a processor 134, and a memory 150. The interface 132 is used by the database system 130 for communicating with other systems in a distributed environment—including within the environment 100—connected to the network 120; for example, the clients 180, as well as other systems communicably coupled to the network 120 (not illustrated). Generally, the interface 132 comprises logic encoded in software and/or hardware in a suitable combination and operable to communicate with the network 120. More specifically, the interface 132 may comprise software supporting one or more communication protocols associated with communications such that the network 120 or interface's hardware is operable to communicate physical signals within and outside of the illustrated environment 100.

As illustrated in FIG. 1, the database system 130 includes a processor 134. Although illustrated as a single processor 134 in FIG. 1, two or more processors may be used according to particular needs, desires, or particular implementations of environment 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the database system 130. Specifically, the processor 134 may execute the functionality required to receive and respond to requests from the clients 180.

As described, the database system 130 includes the data separation manager 140. In some implementations, the data separation manager 140 is a program or set of programs operable to monitor statistics related to the tenant data 176, 192 associated with tenants 170, and perform various migration actions to move the tenant data 176, 192 between different separation schemes according to the separation scheme rules 174. In some cases, the data separation manager 140 may be located and execute on the same computing device as the database 160. The data separation manager 140 may also be located on a separate computing device from the database 160, such as a computing device connected to the database 160 over the network 120. In some instances, the data separation manager 140 may be implemented as one or more software components, one or more hardware components, combination of software and hardware components, and/or implemented in other ways.

As illustrated, the data separation manager 140 includes a rules engine 142. The rules engine 142 may be operable to monitor statistics associated with the tenant data 176, 192 to determine whether any of the tenants 170 are violating any of the separation scheme rules 174. For example, the rules engine 142 may monitor the total disk space used by a particular tenant 170 in light of a separation scheme rule 174 indicating that tenants using column-based separation should use no more than one gigabyte of total disk space.

The data separation manager 140 also includes a data migration engine 144. The data migration engine 144 may be operable to migrate portions of tenant data 176, 192 associated with a particular tenant 170 to a different separation scheme than is currently using. In some cases, the data migration engine 144 may be called by the rules engine 142 in response to detecting that one of the separation scheme rules 174 has been violated. For example, the rules engine 142 may detect that a certain separation scheme rule 174 has been violated. The separation scheme rule 174 may state that a tenant violating the rule should be migrated to schema-based separation. To perform the migration, the data migration engine 144 may (i) select the portion of tenant data 176, 192 associated with the particular tenant; (ii) remove the column-based separator column from the data; (iii) create a new schema in the database 160 associated with the particular tenant; and (iv) insert the data into the new schema.

In some cases, the data separation manager 140 may interact with the external database 190 in order to perform migrations. For example, if a tenant using schema-based separation stored within the database 160 violates one of the separation scheme rules 174 that indicates the tenant should be migrated to database separation, the data migration engine 144 may migrate the data associated with the tenant from the database 162 the database 190. In such a case, the database 190 may be dedicated to the particular tenant, such that no other tenant's data will be stored in database 190.

As shown, the data separation manager 140 also includes a suggestion engine 146. In some implementations, the suggestion engine 146 may be operable to suggest a migration from one separation scheme to another to a tenant. In some cases, the suggestion engine 146 may present such a suggestion to the tenant when the rules engine 142 detects that a separation scheme rule 174 has been violated and that the rule indicates that a suggestion should be made. The suggestion engine 146 may also present suggestions to a particular tenant when the tenant is substantially close to violating one of the separation scheme rules. For example, if a particular tenant is within 100 MB of violating a disk space usage rule that would cause the tenant to be automatically migrated to schema-based separation, suggestion engine 146 may present a suggestion to the tenant stating that the tenant would experience better performance if it moved its data to schema-based separation.

In some implementations, the suggestion engine 146 may present suggestions to the tenants in electronic formats, such as emails, text messages, responses to queries, indication to the client application (e.g., 186), and/or other formats.

The database system 130 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the database system 130. Additionally, the memory 150 may include any other appropriate data, such as VPN applications, firmware logs and policies, firewall policies, a security or access log, print or other reporting files, as well as others.

As illustrated in FIG. 1, memory 150 includes or references data and information associated with and/or related to with the techniques described herein. As illustrated, memory 150 includes a database 160. The database 160 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products. Further, database 160 may be operable to process queries specified in any structured or other query language such as, for example, Structured Query Language (SQL).

The database 160 includes one or more tenants 170. The tenants 170 may include information associated with and/or about entities having data included in tenant data 176 (or alternatively, tenant data 192 in remote database 190). In some implementations, the information may include billing information, configuration information, contact information for administrators or other users, and/or other information about the particular tenant. In some cases, the tenants 170 may be stored within the database 160 in one or more rows in a table or collection of tables. The tenants 170 may each include a unique identifier to distinguish each tenant from each other. In some implementations, this unique identifier may be used in a column-based separation scheme to indicate which rows are associated with which tenant (e.g., the tenant ID shown in FIG. 2).

As shown, the database 160 includes separation scheme configurations 172. The separation scheme configurations 172 may store information about which separation scheme each of the tenants 170 is currently using. For example, the separation scheme configuration 172 for a tenant 170 may indicate that the tenant is currently using column-based separation. In some implementations, the data separation manager 140 may update the separation scheme configurations 172 when data for a particular tenant is migrated from one separation scheme to another.

The database 160 also includes separation scheme rules 174. In some implementations, each of the separation scheme rules 174 includes a violation condition indicating a condition causing the rule to be violated. For example, a separation scheme rule 174 may indicate that a tenant using more than 1 gigabyte of disk space will violate the rule. The separation scheme rules 174 may include violation conditions related to various statistics or metrics associated with the tenant data 176, 192, including processor usage, memory usage, disk usage, load average, network utilization, number of rows stored, number of data accesses per second, access latency, and/or other statistics or metrics. In some implementations, each of the separation scheme rules 174 may contain multiple violation conditions, and may be configured such that violating a single condition triggers the rule, or such that all of the multiple violation conditions must be violated to trigger the rule.

Each of the separation scheme rules 174 may also include one or more migration actions. In some implementations, the migration actions may include migrating data from one separation scheme to another (as described relative to the data migration engine 144), suggesting migrations of data from one separation scheme to another (as described relative to suggestion engine 146), and/or other actions.

The database 160 also includes tenant data 176. In some implementations, the tenant data 176 may be data stored by the one or more tenants 170. The tenant data 176 may be organized in a column-based separation scheme, a schema-based separation scheme, a database separation scheme, and/or other separation schemes. In some cases, the tenant data 176 may be data related to a tenant's data business, operations, applications, and/or other data.

The example environment 100 also includes an external database 190 communicably coupled to network 120, and by extension, database system 130. In some implementations, the external database 190 is separate from the database 160. The external database 190 stores tenant data 192. In some implementations, the database 190 stores the tenant data 192 using a database separation scheme, such that all of the tenant data 192 is associated with a single tenant. In some cases, the database 190 may store the tenant data 192 according to a column-based separation scheme, a schema-based separation scheme, and/or other separation schemes. The external database 190 may be used additionally implemented in environment 100 or it may be used as an alternative to database 160. In some instances, one or more of the elements described in database 160 may be stored, at least in part, in database 190. Database 190 may be a cloud-based or on-demand solution, as well as any suitable implementation.

The example environment 100 also includes one or more clients 180. Each client 180 is intended to encompass any computing device such as a desktop computer, laptop/notebook computer, wireless data port, smart phone, personal data assistant (PDA), tablet computing device, one or more processors within these devices, or any other suitable processing device. For example, client 180 may comprise a computer that includes an input device, such as a keypad, touch screen, or other device that can accept user information, and an output device that conveys information associated with the operation of the database system 130 or client 180 itself, including digital data, visual information, or a graphical user interface (GUI). Client 180 may include an interface 189, a processor 184, a client application 186, and a memory 188.

FIG. 2 is a block diagram illustrating an example data configuration 200 using a column-based separation scheme. The data configuration 200 includes a database 202. In some implementations, the database 202 may be similar or identical to the databases 160 and 190 in example environment 100. As shown, the database 202 includes a table 204 including data from multiple tenants. The table includes rows 206a-c. Each of the rows 206 A3 C includes a tenant identification column 207. Tenant identification column 207 indicates which tenant each of the rows 206 A3 C is associated with. For example, rows 206 a and c are associated with a first tenant having a tenant identifier of "1." Row 206 b is associated with the second tenant having tenant identifier "2."

In some implementations, a client accessing column separated data may access the data through the software library that will automatically insert the appropriate tenant identifier into a query. For example, if a client associated with tenant identifier "1" issues the SQL query "SELECT * from table where ID=1", the software library may transform the SQL query into the following: "SELECT * from table where ID=1 and tenantID=1."

FIG. 3 is a block diagram illustrating an example data configuration 300 using a schema-based separation scheme. Generally, the schema-based separation scheme differs from the column-based separation scheme in that data for each tenant is stored in a separate schema within the database. As shown, the example data configuration 300 includes a database 302 including schema 304 and schema 310. Each of the schemas 304, 310 may be associated with a different tenants, and may store data for that tenant. Schema 304 includes a table 306 storing rows 308a-b. Note that table 306, unlike table 204 from FIG. 2, does not include the tenant identification column 207, as data for only one tenant is stored within each schema. Schema 310 also includes a table 312 and a row 314. Schema 304 includes the data from FIG. 2 associated with tenant identifier "1," while schema 304 includes the data from FIG. 2 associated with tenant identifier "2."

FIG. 4 is a block diagram illustrating an example data configuration using a database separation scheme. In such a scheme, data for different tenants is stored in different databases. The databases may be separate database instances running on a single server, database instances running on separate servers, and/or other configurations. As shown, the data configuration 400 includes a database 402. The database 402 includes a table 404 storing rows 406a-b. The database 402 stores the data associated with tenant identifier "1" from FIG. 2, which may also be the same data stored in schema 304 and FIG. 3. The example configuration 400 also includes a database 408. The database 408 includes table 410 and row 412. The database 408 stores the data associated with tenant identifier "2" from FIG. 2, which may also be the same data stored in schema 310 and FIG. 3.

Figure 5:
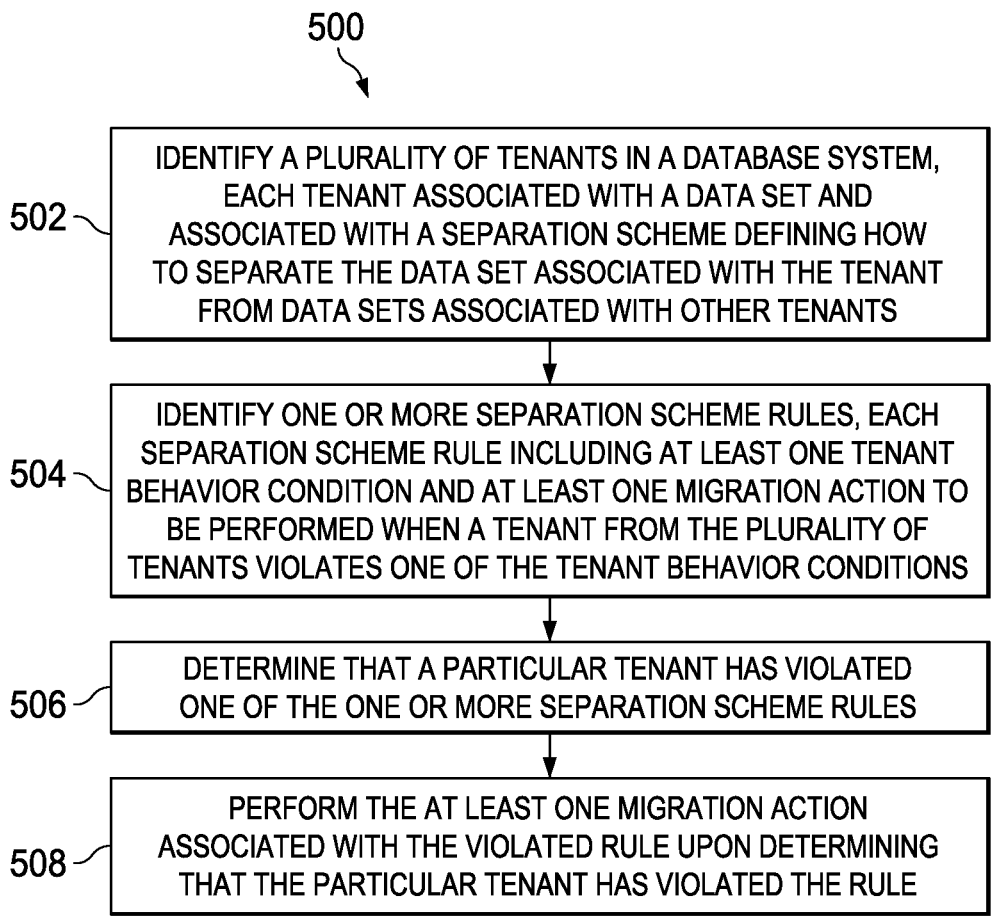
FIG. 5 is a flowchart illustrating an example method for providing a multi-layered multi-tenancy database architecture.

FIG. 5 is a flowchart illustrating an example method 500 for providing a multi-layered multi-tenancy database architecture. For clarity of presentation, the description that follows generally describes method 500 in the context of FIG. 1. However, method 500 may be performed, for example, by any other suitable system, environment, software, and hardware, or a combination of systems, environments, software, and hardware, as appropriate. For example, one or more of the database system, the client, or other computing device (not illustrated) can be used to execute method 500 and obtain any data from the memory of the client, the database system, or the other computing device (not illustrated).

At 502, a plurality of tenants in a database system identified, each tenant associated with a corresponding data set and a separation scheme defining how to separate the data set associated with the tenant from data sets associated with other tenants. In some implementations, the separation schemes may include one or a column-based separation, a schema-based separation, a database separation, and/or any other suitable scheme.

At 504, one or more separation scheme rules are identified, each separation scheme rule including at least one tenant behavior condition and at least one migration action to be performed when the tenant from the plurality of tenants violates one of the tenant behavior conditions. In some implementations, the separation scheme rules may be similar to the separation scheme rules 174 from FIG. 1, with the separation scheme rules being managed and enforced by the data separation manager 140 and/or the rules engine 142. Alternative implementations may also perform the operations of FIG. 1. The at least one tenant behavior condition may include threshold values associated with statistics, metrics, or other performance indicators related to access to the tenant's data and/or database usage, such as processor usage, network usage, disk usage, memory usage, access latency, and/or other suitable metrics.

At 506, a determination is made that a particular tenant has violated one of the one or more separation scheme rules. In some implementations, the determination may be made by a rules engine (e.g., 142). The determination may be made by comparing the current state of metrics associated with a tenant's data to the tenant behavior condition defined within a particular separation scheme rule. For example, if the tenant behavior condition states that have less than 1 gigabyte of the space used, and the tenant is using 2 gigabytes of disk space, the tenant has violated the associated rule.

At 508, the at least one migration action associated with the violated rule is performed upon determining that the particular tenant has violated the rule. In some implementations, the at least one migration action includes migrating data from one separation scheme to another, such as described relative to the data migration engine 144 of FIG. 1. The at least one migration action may also include suggesting a migration action to the particular tenant, such as described relative to the suggestion engine 146 of FIG. 1.

In some implementations, the migration action includes moving the data set from the associated separation scheme to a different separation scheme. Moving the data set from the current associated separation scheme to the different separation scheme may include selecting the data set from a first location, transforming the selected data set according to the different separation scheme, inserting the transformed data into a second location associated with the different separation scheme, and removing the prior data set from the first location.

In some cases, the method 500 may include updating a tenant connection to indicate that requests for the data set should go to the second location. For example, a notification may be sent to clients connected to the system that data associated with a particular tenant has moved to a new location. In response, the clients may update their connections to the new location. In some instances, information identifying the connections may be automatically updated in response to identifying a change in separation scheme that may change the location of the data set. Additionally or alternatively, an update on how to access the data (i.e., an updated SELECT statement or parameters) may be provided to clients and other connected systems, as the method of connecting to the new location may differ from the method of connecting to the prior location.

The migration action may include changing a tenant payment scheme based on a new separation scheme. For example, separation schemes providing greater separation, such as database separation, may be charged a higher rate than separate schemes providing less data separation (e.g., column-based separation). When migrating a tenant from a lower to a higher level of separation, the payment scheme may be updated to reflect a higher price. In some implementations, the price may a price per gigabyte of storage, per server, per schema, per client, and/or other units.

The preceding figures and accompanying description illustrate example processes and computer implementable techniques. But environment 100 (or its software or other components) contemplates using, implementing, or executing any suitable technique for performing these and other tasks. These processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
   identifying a plurality of tenants in a database system, each tenant associated with a data set and associated with a current separation scheme defining how to separate the data set associated with the tenant from data sets associated with other tenants, each separation scheme associated with one or more separation scheme rules;
   identifying one or more separation scheme rules, each separation scheme rule including at least one tenant behavior condition and at least one migration action to be performed when a tenant from the plurality of tenants violates one of the tenant behavior conditions, where the at least one migration action includes moving the data set from the current separation scheme to a different separation scheme;
   determining that a particular tenant has violated one of the one or more separation scheme rules associated with the current separation scheme associated with the particular tenant; and
   performing, within the database system and for the particular tenant, the at least one migration action associated with the violated rule in response to determining that the particular tenant has violated the rule.

2. The method of claim 1, wherein the separation scheme is one of column-based separation, schema-based separation, or database separation.

3. The method of claim 1, wherein moving the data set from the current separation scheme to the different separation scheme comprises:
   selecting the data set from a first location;
   transforming the selected data set according to the different separation scheme;
   inserting the data into a second location associated with the different separation scheme; and
   removing the data set from the first location.

4. The method of claim 3, further comprising updating a tenant connection to indicate that requests for the data set should go to the second location.

5. The method of claim 1, wherein the migration action includes changing a tenant payment scheme based on a new separation scheme.

6. The method of claim 1, wherein the migration action includes suggesting that the data set be migrated to a different separation scheme.

7. The method of claim 1, wherein tenant behavior conditions include at least one of: a memory threshold, a processor usage threshold, a data set size threshold, a disk usage threshold, or a network usage threshold.

8. A system, comprising:
   memory for storing data; and
   one or more processors operable to perform operations comprising:

identifying a plurality of tenants in a database system, each tenant associated with a data set and associated with a separation scheme defining how to separate the data set associated with the tenant from data sets associated with other tenants, each separation scheme associated with one or more separation scheme rules;

identifying one or more separation scheme rules, each separation scheme rule including at least one tenant behavior condition and at least one migration action to be performed when a tenant from the plurality of tenants violates one of the tenant behavior conditions, where the at least one migration action includes moving the data set from the current separation scheme to a different separation scheme;

determining that a particular tenant has violated one of the one or more separation scheme rules associated with the current separation scheme associated with the particular tenant; and performing, within the database system and for the particular tenant, the at least one migration action associated with the violated rule in response to determining that the particular tenant has violated the rule.

9. The system of claim 8, wherein the separation scheme is one of column-based separation, schema-based separation, or database separation.

10. The system of claim 8, wherein moving the data set from the current separation scheme to the different separation scheme comprises:

selecting the data set from a first location;
transforming the selected data set according to the different separation scheme;
inserting the data into a second location associated with the different separation scheme; and
removing the data set from the first location.

11. The system of claim 10, further comprising updating a tenant connection to indicate that requests for the data set should go to the second location.

12. The system of claim 8, wherein the migration action includes changing a tenant payment scheme based on a new separation scheme.

13. The system of claim 8, wherein the migration action includes suggesting that the data set be migrated to a different separation scheme.

14. The system of claim 8, wherein tenant behavior conditions include at least one of: a memory threshold, a processor usage threshold, a data set size threshold, a disk usage threshold, or a network usage threshold.

15. A computer program product encoded on a tangible, non-transitory storage medium, the product comprising computer readable instructions for causing one or more processors to perform operations comprising:

identifying a plurality of tenants in a database system, each tenant associated with a data set and associated with a separation scheme defining how to separate the data set associated with the tenant from data sets associated with other tenants, each separation scheme associated with one or more separation scheme rules;

identifying one or more separation scheme rules, each separation scheme rule including at least one tenant behavior condition and at least one migration action to be performed when a tenant from the plurality of tenants violates one of the tenant behavior conditions, where the at least one migration action includes moving the data set from the current separation scheme to a different separation scheme;

determining that a particular tenant has violated one of the one or more separation scheme rules associated with the current separation scheme associated with the particular tenant; and performing, within the database system and for the particular tenant, the at least one migration action associated with the violated rule in response to determining that the particular tenant has violated the rule.

16. The computer program product of claim 15, wherein moving the data set from the current separation scheme to the different separation scheme comprises:

selecting the data set from a first location;
transforming the selected data set according to the different separation scheme;
inserting the data into a second location associated with the different separation scheme; and
removing the data set from the first location.

17. The computer program product of claim 15, wherein tenant behavior conditions include at least one of: a memory threshold, a processor usage threshold, a data set size threshold, a disk usage threshold, or a network usage threshold.

* * * * *